United States Patent [19]

Ara

[11] Patent Number: 4,870,329
[45] Date of Patent: Sep. 26, 1989

[54] DIGITAL CONVERGENCE CIRCUIT STORING COEFFICIENTS OF FUNDAMENTAL WAVES OF CORRECTION DATA

[75] Inventor: Kouichi Ara, Osaka, Japan

[73] Assignee: Nippon Gijutsu Boeki Co., Ltd., Osaka, Japan

[21] Appl. No.: 162,295

[22] Filed: Feb. 29, 1988

[30] Foreign Application Priority Data

Feb. 27, 1987 [JP] Japan .................................. 62-44594
Feb. 27, 1987 [JP] Japan .................................. 62-44595
Feb. 27, 1987 [JP] Japan .................................. 62-44596
Feb. 27, 1987 [JP] Japan .................................. 62-44597

[51] Int. Cl.$^4$ ........................ H01J 29/70; H01J 29/72
[52] U.S. Cl. ..................................... 315/367; 315/368
[58] Field of Search ............... 315/367, 368, 370, 371; 358/60, 10

[56] References Cited

U.S. PATENT DOCUMENTS 4,203,054  5/1980  Sowter .............................. 315/368
4,754,204  6/1988  Ando et al. ....................... 315/367

Primary Examiner—Thomas H. Tarcza
Assistant Examiner—Gregory C. Issing
Attorney, Agent, or Firm—Cushman, Darby & Cushman

[57] ABSTRACT

A digital conversion circuit with a convergence deviation correcting circuit. A coefficient storing circuit stores coefficients of fundamental correction waves. By weighting these fundamental correction waves using the coefficient storing circuit, a correction data storing circuit is provided with correcting data. Controlling means controls this entire operation. Using the correction data, the convergent deviation of a scanning line of a scanning picture is corrected. By weighting each fundamental correction wave with a weighting coefficient, a synthesized wave is produced. This synthesized correction data is read from a correction data storing circuit in synchronism with deflection scanning and is supplied to a convergence deviation correcting circuit.

32 Claims, 5 Drawing Sheets

FIG. 6
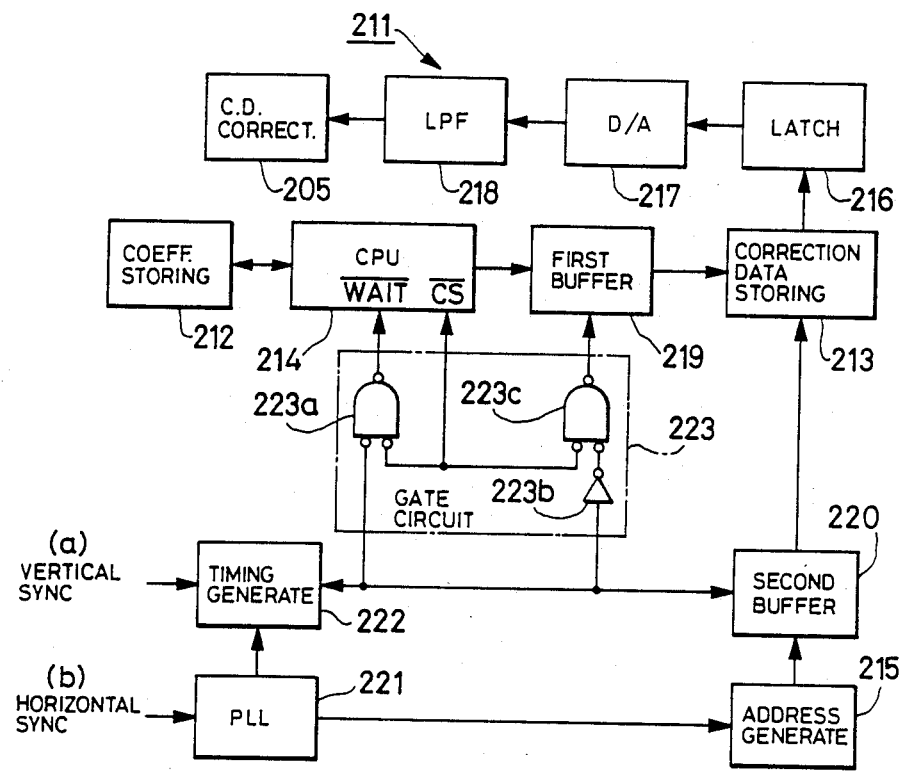
FIG. 7(A) TIMING CKT 222 OUTPUT
FIG. 7(B) FIRST BUFFER 219 OUTPUT
FIG. 7(C) SECOND BUFFER 220 OUTPUT
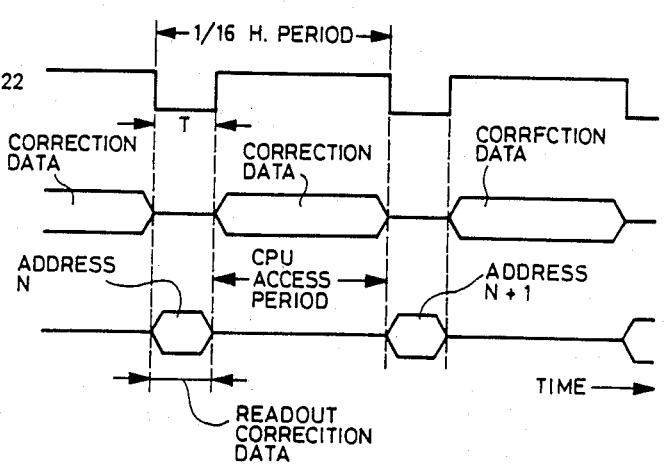

DIGITAL CONVERGENCE CIRCUIT STORING COEFFICIENTS OF FUNDAMENTAL WAVES OF CORRECTION DATA

FIELD OF THE INVENTION

The present invention relates in general to an improved digital convergence circuit for correcting the deviation of a scanning line of a picture image. More particularly, the present invention relates to a digital convergence circuit capable of computing correction data required for correcting the convergent deviation of a scanning line of a picture image within a short period of time. This is done by controlling the length of an access period, during which correction data for the convergence is stored, in a correction data storing circuit, and by computing the correction data from synthesized waves of fundamental correction waves. The digital convergence circuit is further capable of correcting the convergent deviation of a scanning line of a picture image, corresponding to a change in the number of scanning lines.

BACKGROUND AND SUMMARY OF THE INVENTION

Production television systems have become very prevalent in the art. While tube-type television systems can actually produce better resolution and more brightness, the size of such projection tubes has been limited by cost and weight. At the present stage of development of television receivers, a 35-inch projection television may cost one-tenth of the price of a 35-inch tube-type television system. Therefore, such projection receivers are very useful, and have gained wide user popularity.

A projection television receiver synthesizes images on a screen by projecting these images from three tube projectors. Each of the three tube projectors projects one monochromatic image corresponding to one of the three primary colors—red, green and blue. However, the convergence between the three tube projectors has a tendency to be influenced by terrestrial magnetism. Due to the large viewing surface and the necessity for accurate viewing synchronization, it is very important to converge these red, green and blue scans.

It is therefore required to correct the convergent deviation of each scanning line using a convergence adjustment. This deviation can be created by terrestrial magnetism, by changing the direction of the projection cathode ray tube, or by adjusting a posture thereof.

FIG. 1 illustrates a conventional digital convergence circuit 1 used in a projection type television receiver 4. This television projects images on a front-facing screen 3 from monochromatic projection RGB cathode-ray tubes 2r, 2g, and 2b. Horizontal and vertical convergence coils (not illustrated) are provided for each of the projection cathode-ray tubes 2r, 2g and 2b, and are incorporated in a convergence deviation correcting circuit 5. Storing circuit 6 is connected to convergence deviation correcting circuit 5. Storing circuit 6 stores correction data necessary for correcting the convergent deviation of each of the sampling points in the matrix on screen 3. This data has been previously correlated and is stored in storing circuit 6. The reading of the correction data from storing circuit 6 is controlled by a readout control circuit 7 to be synchronized with deflection scanning, so that the correction factors are supplied to the convergent deviation correcting circuit 5 synchronized with deflection scanning.

In order to adjust the convergence of this kind of prior art digital convergence circuit 1, adjustment images of, e.g., a crosshatch pattern or a dot pattern are projected on the screen 3. Then, correction data required for correcting the convergent deviation is collected and stored in storing circuit 6. The optimal correction data must, however, be obtained on a trial-and-error basis while varying the correction data supplied to the convergent deviation correcting circuit 5 for every sampling point. For this reason, a long operating time is necessary for this process. Moreover, an increase in the capacity of storing circuit 6 becomes inevitable as the sampling points increase in number. In some projectors—especially a multi-scan projector-type in which a deflection mode is automatically changed-over corresponding to horizontal deflection frequencies of 15 to 41 kHz-wave filtering characteristics of the convergence coils and their driving circuits, as well as characteristics of a deflection circuit vary according to the horizontal deflection frequencies. This correspondingly causes the correction data that needs to be stored in the storing circuit 6 to become different for the different horizontal frequencies. This requires a still larger capacity of storing circuit 6.

The conventional digital convergence circuit 1 uses readout control circuit 7 to generate address signals in accordance with clock signals obtained by multiplying or dividing frequencies of the horizontal synchronization signals, while synchronizing with these signals. If the correction data is necessary for the correction of convergence deviation, the correction data stored in the address designated by the address signals are read from storing circuit 6. The multi-scan projector therefore has numerous problems. For one, when a scanning line density changes from a high level density to a low level density, and the correction data are read in accordance with the address designated by readout control circuit 7 in a conventional mode, some correction data remains unread at the end of the picture scanning. The correction data originally has a vertical symmetry with respect to the center of the picture, and has a symmetric center with respect to portions other than the center of the picture. As a result, the convergence correction does not completely correct the convergence.

It is therefore a primary object of the invention to obviate the above-described problems by providing a digital convergence circuit capable of computing correction data within a short period of time which are required for correcting convergent deviation of a scanning line of scanning a picture.

To this end, according to one aspect of the invention there is provided a digital convergence circuit capable of correcting the convergent deviation of the scanning line in accordance with variations in number of scanning lines.

This digital convergence circuit includes a coefficient storing structure that stores weighting coefficients for each of a plurality of fundamental correction waves. These fundamental correction waves have either a horizontal scanning period or a vertical scanning period. The fundamental correction waves are waves that can be weighted by weighting coefficients stored in the coefficient storing means, in order to form synthesized waves. The synthesized waves are then representative of the correction data that is used to correct a deviation of a scanning line of the picture. The coefficients stored in the coefficient storing means are then used along with the fundamental correction waves to form correction data. This correction data is stored in a correction data storing device. The correction data is read from the correction data storing device in synchronism with the deflection scanning, and the convergence of the scanning line is corrected. The fundamental correction waves can include parabolic undulation waves with a vertical or horizontal scanning period, serrated undulation waves, parabolic waves amplitude modulated by the serrated waves or serrated waves amplitude modulated by the parabolic waves.

Another aspect of the invention includes a correction data storing device which stores correction data for correcting a convergence deviation of a scanning line. This correction data is stored at addresses corresponding to locations in the picture. An address generating device produces addresses to address this correction data in synchronism with clock pulses that are obtained from a synchronization signal of the picture. A readout starting address of the correction data storing device is determined in accordance with a number of scanning lines. This enables obtaining a same correction data at the center of the picture, independent of the number of scanning lines. As such, vertical symmetry of the correction data can be ensured.

According to yet another aspect of the invention, correction data storing means stores data for each of a plurality of sampling points that split the picture into a matrix. A readout address generating device designates an address of the correction data storing device from which to read. The central processor computes the correction data and writes the data to the correction data storing device at addresses corresponding to locations on the picture. The correction data is computed using a correction function which includes a coefficient that is variably set and a variable indicating deflection scanning position when adjusting the convergence. This aspect of the invention also splits one horizontal scanning period into a plurality of access periods. The plurality of access periods correspond to a number of sampling points arranged in a horizontal direction of the picture scanning. These access periods are divided into a first period which is a time required to address the address generating device and a second access period which is an access period of the central processor to the correction data storing device. According to yet another aspect of the invention, this latter addressing period is a fixed period which does not fluctuate with the horizontal scanning frequency.

BRIEF DESCRIPTION OF THE DRAWINGS

These and other advantages of the invention will be described in detail with reference to the accompanying drawings, wherein:

FIG. 6 is a circuit diagram of the digital convergence circuit of the third embodiment of the present invention;

FIGS. 7A-7C are signal waveform charts of the individual constituent circuits depicted in FIG. 6.

DETAILED DESCRIPTION OF THE PREFERRED EMBODIMENT

Figure 1:
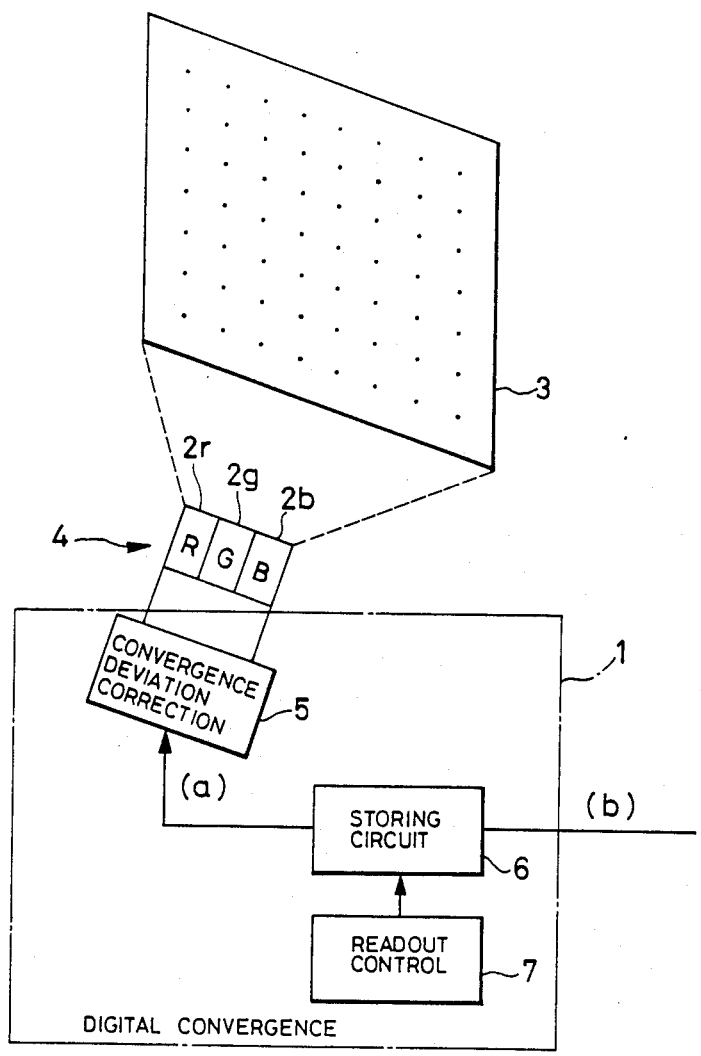
FIG. 1 is a circuit diagram illustrating one example of a prior art digital convergence circuit.
Figure 2:
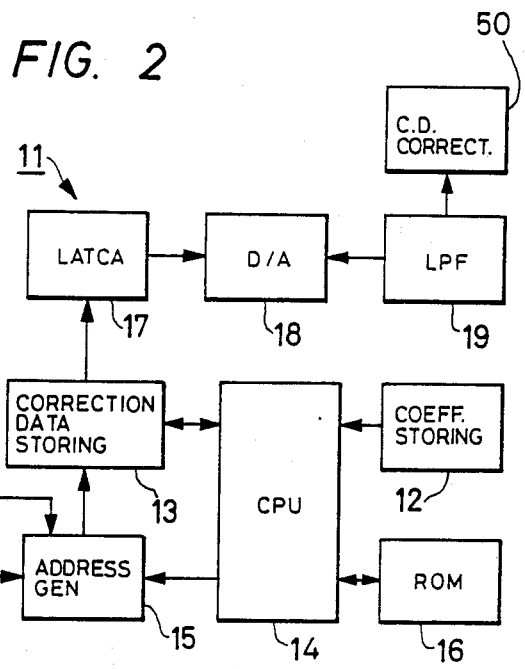
FIG. 2 is a circuit diagram of a digital convergence circuit of the first embodiment of the present invention.

FIG. 2 illustrates a circuit diagram of a first embodiment of the digital convergence circuit of the present invention. FIGS. 3A-3G are waveform charts of fundamental correction waves which are used to constitute the correction data according to the present invention. The correction data is formed by using weighting coefficients to weight at least one of the plurality of fundamental correction waves shown respectively in FIGS. 3A-3G. By appropriately weighting one of these waves, a synthesized wave is formed, which is used as the correction data. This will be described in detail herein.

Digital convergence circuit 11 is shown in FIG. 2. The coefficients for the fundamental correction waves of FIGS. 3A-3G are stored in coefficient storing circuit 12. A weighting coefficient is stored for each individual fundamental correction wave. The correction data are then defined as synthesized waves of the fundamental correction waves having a horizontal scanning period or a vertical scanning period. The picture is defined as being split into a matrix and a correction data storing circuit 13 stores correction data for each of the sampling points of the picture matrix. This correction data is computed using the coefficients read from the coefficient storing circuit 12. Controlling means reads the correction data from correction data storing circuit 13 and supplies the correction data to a convergence deviation correcting circuit 50 which may be similar to circuit 5.

The controlling means to perform the above functions includes a central processing unit 14 and an address generating circuit 15 for designating an address for reading the correction data from correction data storing circuit 13. ROM 16 is connected to the central processing unit 14 for storing software and the coefficient storing circuit 12 and the correction data storing circuit 13 are also connected to CPU 14. ROM 16 also stores the fundamental correction waves. In this embodiment, the correction data is determined based on the coefficients stored in the coefficient storing circuit 12, and once determined is written to correction data storing circuit 13 under control of CPU 14. The correction data read from correction data storing circuit 13 is latched by a latch circuit 17 and then transmitted to a D/A converter 18 which converts the data into analog signals. These analog signals are transmitted to a low pass filter circuit 19 which eliminates any folded distortion and then passes the signals to convergence deviation correcting circuit 50.

Address generating circuit 15 is connected to a timing generating circuit 20. This circuit generates timing pulses for determining a readout timing based on vertical synchronization signals concomitant to the image signals. A phase-locked loop circuit 21 is also connected to address generator 15, to generate frequency multiplying signals which are phase-locked to the horizontal synchronization signals. Address generating circuit 15 is arranged such that operating clock signals necessary for addressing can be generated in synchronism with the horizontal deflection scanning.

In order to operate the system, coefficients of the respective fundamental waves must be collected as eigendata for the convergence correction. The convergence correction then uses synthesized waves as the convergence correction data. These synthesized waves include seven kinds of fundamental correction waves, weighted by the correction coefficients. This weighting may be by, for example, adding.

Figure 3:
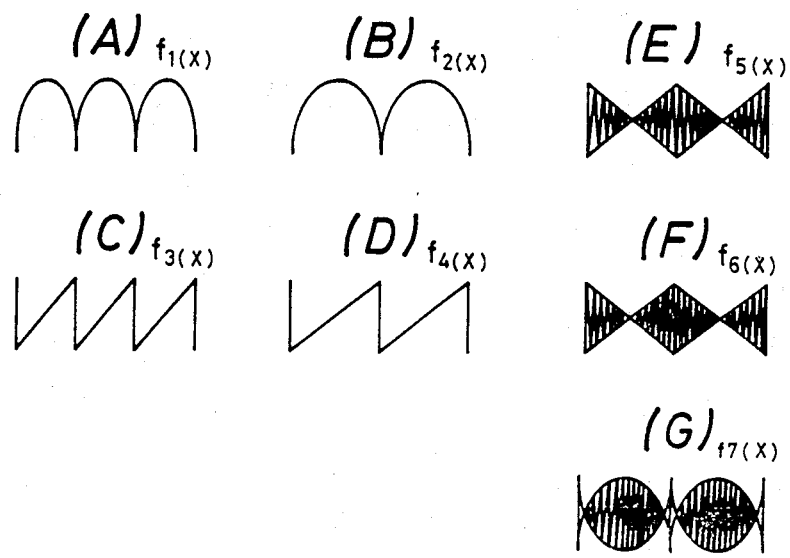
FIGS. 3A-3G are waveform charts of fundamental correction waves for forming correction data.

FIGS. 3(A) through 3(G) illustrate the seven kinds of fundamental correction waves that are preferably used. FIGS. 3(A) and 3(B) illustrate parabolic undulation waves $f_1(x)$ and $f_2(x)$, respectively, which have a horizontal scanning period and a vertical scanning period. FIGS. 3(C) and 3(D) are serrated undulation waves, $f_3(x)$ and $f_4(x)$ respectively, and FIGS. 3(E) and 3(F) are parabolic undulation waves $f_5(x)$ and $f_6(x)$ respectively which have a horizontal scanning period and are amplitude-modulated by serrated undulation waves having a vertical scanning period. FIG. 3(G) shows a serrated undulation wave $f_7(x)$ which has a horizontal scanning period and is amplitudemodulated by a parabolic undulation wave having a vertical scanning period.

A convergence correction quantity Y, of one scanning line at a distance x from a scanning initial point is given by:

$$Y = \Sigma K_j f_j(x)$$
$$= K_1 f_1(x) + K_2 f_2(x) \ldots + K_7 f_7(x)$$

The weighting coefficients $K_1$ to $K_7$ in this formula are those stored in the coefficient storing circuit 12. These can be values determined on a trial-and-error basis when adjusting the convergence, for example as described herein. The convergence deviation on the picture is initially visually observed while varying a value of $K_1$ in order to determine the coefficient $K_1$ of the fundamental correction wave $f_1(x)$ which exerts the greatest influence on the correction of convergence deviation. Central processing unit 14 computes the correction data at individual points which split the picture into a matrix with respect to the temporarily set coefficient $K_1$, and commands the correction data storing circuit 13 to store this correction data. Subsequently, correction data storing circuit 13 reads the stored correction data in synchronism with the horizontal deflection scanning, to sequentially supply the data to the convergence deviation correcting circuit 50. An adjuster who is adjusting the convergence of the picture tube commands the coefficient storing circuit 12 to store a value of the coefficient $K_1$, which seems to that adjuster to be associated with the least convergent deviation on the picture while varying the value of the coefficient $K_1$.

Subsequently, a value of the coefficient $K_2$ is similarly determined by visual observation with respect to the fundamental correction wave f(x) which is next to the fundamental correction wave f(x) in terms of exerting an influence on the convergence correction quantity. In this way, a range of adjustment is gradually narrowed down to such an extent that optimal values of all the coefficients $K_1$ to $K_7$ can be determined. Upon completion of the adjustment, the thus determined coefficients $K_1$ to $K_7$ are all stored in coefficient storing circuit 12. At the end of this process, all coefficients $K_1$ to $K_7$ have therefore been stored in coefficient storing circuit 12.

Therefore, all the correction data needed for correcting the convergence deviation are stored in the correction data storing circuit 13, and the adjustment of convergence is therefore also completed. After the convergence deviation has thus been completed, the correction of convergent deviation is subsequently executed for every scanning point on the picture in accordance with correction data read from the correction data storing circuit 13.

The digital convergence circuit 11, as explained earlier, defines the correction data necessary for the correction of convergent deviation of the scanning line of scanning the picture as synthesized waves. These synthesized waves are formed of fundamental correction waves $f_1(x)$ through $f_7(x)$ that have a horizontal scanning period and a vertical scanning period which is weighted by adding coefficients thereto. Only the coefficients $K_1$ to $K_7$ of the fundamental correction waves $f_1(x)$ through $f_7(x)$ are stored, as eigendata appropriated to the correction. Therefore the coefficient storing circuit 12 for storing the coefficients $K_1$ to $K_7$ of the fundamental correction waves $f_1(x)$ to $f_7(x)$ does not require as much storage capacity, as long as only the fundamental correction waves $f_1(x)$ to $f_7(x)$ can be determined. In consequence, the cost of the coefficient storing circuit 12 is reduced. When determining the fundamental correction waves $f_1(x)$ to $f_7(x)$, the coefficients are determined sequentially from the fundamental correction wave $f_1(x)$ in the order of those having greater influence on the convergence correction data. This arrangement permits convergence adjustment using a much simpler operation than that in a system of determining the correction data one by one for each point on the picture.

Figure 4:
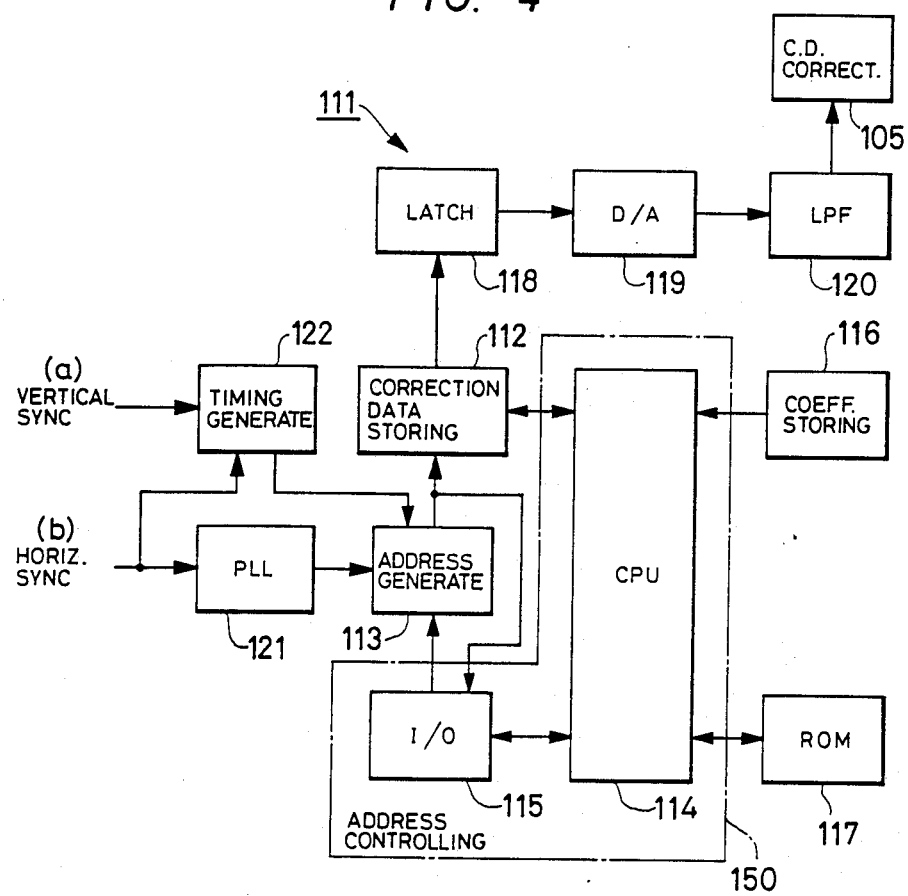
FIG. 4 is a circuit diagram of the digital convergence circuit of the second embodiment of the present invention.
Figure 5:
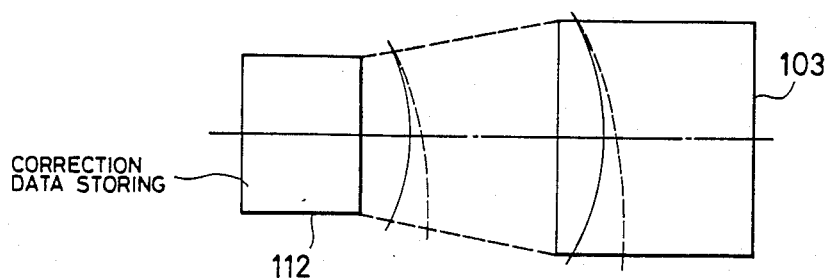
FIG. 5 is an explanatory diagram showing a control operation of the readout address controlling of FIG. 4.

FIG. 4 shows a circuit diagram of a digital convergence circuit of a second embodiment of the present invention. FIG. 5 is an explanatory diagram with which a control operation of the readout address controlling means depicted in FIG. 4 will be explained.

FIG. 4 shows a digital convergence circuit generally designated as 111. Correction data storing circuit 112 stores correction data for correcting the convergence deviation on the picture, at an address corresponding to the location on the picture. This address is produced by address generating circuit 113, which addresses the correction data to be read from correction data storing circuit 112 in accordance with clock pulses obtained by multiplying frequencies of horizontal synchronization signals, so that these clock pulses are synchronized therewith. Address controlling means 150 is connected to address generating circuit 113 for changing a readout starting address in accordance with the number of scanning lines. This allows access of the same correct-ion data at the center of the picture, independent of the number of scanning lines, and to maintain a vertical symmetry of the correction data.

The readout controlling means includes a central processing unit 114 and an input/output circuit 115 provided between address generating circuit 113 and central processing unit 114. Coefficient storing circuit 116 is connected to central processing unit 114, and stores individual coefficients of the fundamental correction waves of FIGS. 3(A)-3(G), obtained while adjusting the convergence as described above. ROM 117 stores software as well as the fundamental correction waves for correction data storing circuit 112. The correction data determined on the basis of the coefficients stored in coefficient storing circuit 116 of this second embodiment are written to correction data storing circuit 112. The correction data read from correction data storing circuit 112 is latched by a latch circuit 118 and transmitted to a D/A converter 119 where the data is converted into analog signals. These analog signals are transmitted to low pass filter circuit 120, which eliminates any folded distortion. The output of LPF 120 is passed to convergence deviation correcting circuit 105.

Phase-locked loop circuit 121 is connected to address generating circuit 113 and generates address forming frequency multiplying signals which are phase-locked with the horizontal synchronization signals. Timing generating circuit 122 is also connected to address generating circuit 113, and is for generating a load pulse for determining a readout timing according to the vertical synchronization signals and the horizontal synchronization signals. Input/output circuit 115 loads a readout starting address, set by central processing unit 114, at the time when the address generating circuit 113 is first supplied with load pulses. The readout starting address is such that the same correction data will be obtained at the center of the picture regardless of the number of scanning lines. Thus, the vertical symmetry of the correction data is maintained by changing over the readout starting address in accordance with the number of scanning lines.

In the usual circumstance, this embodiment operates by emphasizing the vertical symmetry of the correction data. This vertical symmetry will normally be sufficient for a good picture. The correction data will typically have a symmetry between the upper and lower halves of the picture. Moreover, the fundamental correction waves that are used according to the present invention include the parabolic undulation waves that have a vertical scanning period and the modulated waves thereof which have a vertical symmetry.

The convergence correction quantity Y at the distance x from a scanning initial point of one scanning line is expressed as:

$$Y = \Sigma K_j f_j(x)$$
$$= K_1 f_1(x) + K_2 f_2(x) \ldots + K_n f_n(x).$$

This embodiment uses a method in which a range of adjustment is narrowed down by varying the coefficient $K_j$ sequentially from the fundamental correction wave $f_1(x)$ having the greatest influence on the correction of convergent deviation, while visually observing the convergent deviation on the picture. The fundamental correction waves include parabolic undulation waves having a vertical scanning period and their modulated waves. The method of adjusting the convergence is the same as that described in the first embodiment.

Upon completion of the convergence adjustment, the correction of convergent deviation is subsequently executed for every scanning point on the picture on the basis of the correction data read from correction data storing circuit 112. If a scanning line density is varied from a high level to a low level, the addressing of this data has conventionally been practiced beginning from an address O in accordance with the frequency multiplying signals of the horizontal synchronization signals. Therefore, some correction data remain unread at the end of the picture scanning.

FIG. 5 exemplifies a case showing the results of this prior art technique where the correction data prescribed by the parabolic undulation waves having a vertical scanning period are used. The correction data existing at the center of the picture of FIG. 5 do not accord with the previous correction data as depicted with a dotted line of FIG. 5, and the vertical symmetry of the correction data is thereby lost. Central processing unit 114 of the present invention, however, causes the outputs of the address generating circuit 113 to be fed back to the input/output circuit 115, and thereby monitors the number of scanning lines. This enables changing the readout starting address using input/output circuit 115. As a result, the readout of the correction data in the initial stage of scanning which hinders the vertical symmetry is skipped over, and, as indicated by a solid line of FIG. 5, a convergence correction operation which has symmetry between the upper and lower halves of the picture can be performed.

The digital convergence circuit 111 operates in the following manner. Address generating circuit 113 designates a readout address to be read from correction data storing circuit 112, in which the correction data for correcting the convergence deviation of the scanning line of the scanned picture is stored. This address corresponds to the location on the picture, in accordance with the clock pulses generated by a step wherein phaselocked loop circuit 121 multiplies frequencies of the horizontal synchronization signals in synchronism therewith. When changing the number of scanning lines, address controlling means 150 including central processing unit 114 and input/output circuit 115, changes the readout starting address, thereby obtaining the same correction data at the center of the picture even though the number of scanning lines has changed. Therefore, the clock pulses used when address generating circuit 113 executes the addressing may have fixed period which is phase-locked by the horizontal synchronization signals. This may correspond to different horizontal deflection frequencies, simply by varying the readout starting address without changing the clock frequency. Therefore, the processing performed by the software alone suffices, with no addition of a special delay circuit or the like being necessary. Therefore, this digital convergence circuit is particularly suitable for correcting the convergence of a multiscan television receiver which automatically follows the horizontal deflection frequency.

FIG. 6 is a circuit diagram of a digital convergence circuit of a third embodiment of the present invention. FIG. 7 is a signal waveform chart of operation of the circuits depicted in FIG. 6.

FIG. 6 depicts digital convergence circuit 211. Coefficient storing circuit 212 stores a weighting coefficient for each of the fundamental correction waves of FIGS. 3(A)–3(B). The actual correction data is defined as synthesized waves (a correction function) of fundamental correction waves having a horizontal scanning period or a vertical scanning period. A correction data storing circuit 213 stores the correction data for each of the sampling points of the picture matrix. This correction data is computed using coefficients read from coefficient storing circuit 212. An address generating circuit 215 designates an address from which correction data transmitted form the correction data storing circuit 213 is read.

Central processing unit 214 controls storing circuits 212 and 213. In this third embodiment, the correction data determined on the basis of the coefficients stored in coefficient storing circuit 212 are written to correction data storing circuit 213. The correction data read from correction data storing circuit 213 is then latched by latch circuit 216. The latched data is subsequently converted into analog signals by D/A converter 217 and are supplied to low pass filter circuit 218 which is for eliminating folded distortion. The filtered signal is supplied convergence deviation correcting circuit 205.

A first buffer circuit 219 is interposed between central processing unit 214 and correction data storing circuit 213 as a signal gate. Second buffer circuit 220 is interposed between address generating circuit 215 and correction data storing circuit 213. An access period of central processing unit 214 to correction data storing circuit 213 is shown as time period (e) in FIG. 7(B) and does not overlap with an addressing period for correction data storing circuit 213 by the address generating circuit 215. Phase-locked loop circuit 221 generates frequency multiplying signals that are phase-locked with the horizontal synchronization signals. Timing generating circuit 222 generates timing pulses upon receiving the vertical synchronization signals and the frequency multiplying signals, in order to adjust a relative operation timing of each of central processing unit 214 and address generating circuit 215, using buffer circuits 219 and 220. Gate circuit 223 is provided between central processing unit 214, buffer circuit 219 and timing generating circuit 222. Gate circuit 223 can be controlled to produce signals to adjust the operation of central processing unit 214 and buffer circuit 219. The gate circuit 223 includes AND gate circuit 223a which receives output timing pulses of timing generating circuit 222 and chip select signals of the central processing unit 214 as input signals. This AND gate circuit 223a performs a logical NOT product and provides outputs thereof as weight inputs to central processing unit 214. AND gate circuit 223c receives output timing pulses of the timing generating circuit 222 as polarity-inverted by an inverter circuit 223b, and receives chip select signals of the central processing unit 214 as input signals. This AND gate circuit 223c performs a logical NOT product and provides outputs thereof as the gate inputs to the buffer circuit 219.

In the third embodiment, 16 sampling points are provided by horizontally dividing the picture into 16 sections. Timing generating circuit 222 produces a timing pulse every 1/16 of a horizontal scanning period to effect this division. FIG. 7(A) illustrates an initial pulse of a short period, obtained by dividing one horizontal scanning period by a factor of 16, the number of sampling points in the horizontal direction. Buffer circuit 220 receives the timing pulse, and as illustrated in FIG. 7(C), immediately opens the gate for the period T of the pulse. This period T is a length of time that is required for the addressing operation. Buffer circuit 220 supplies the address generated by readout address generating circuit 215 to correction data storing circuit 213. Central processing unit 214 is also supplied with this timing pulse through the AND gate circuit 223a. CPU 214 receives its weight input during a period while the timing pulse is at a low level. FIG. 7(B) illustrates the operation of buffer circuit 219 in response to this pulse. Buffer circuit 219 also closes the gate while buffer circuit 220 opens the gate. After the period T has passed and the timing pulse once again assumes a high level, the weight inputs are removed from the central processing unit 214. Buffer circuit 219 then turns on, and buffer circuit 220 turns off. This results in the readout of the correction data from correction data storing circuit 213 being inhibited. At the same time, however, central processing unit 214 can access correction data storing circuit 213. Because of the advantageous placement of buffers 219 and 220, central processing unit 214 can execute the computation of the correction data, as well as the arithmetic results without any danger of a race condition or interference with read out address generating circuit 215. The address generator can address correction data storing circuit 213 while buffer 220 is conducting, and CPU 214 can address the correction data storing circuit 213 while buffer 219 is operating.

A convergence adjusting method in this third embodiment may be the same as that used in the above-described first embodiment. To reiterate this operation, correction data for convergent deviation of a scanning line of the picture are obtained as weighted functional values. These functional values have respective coefficients which are determined based on values that are set by a user at an optimal value. This user must therefore adjust the convergence and the deflection scanning position and store the coefficient values. Therefore, it is only necessary to store the coefficients $k_1$ to $k_7$ to characterize the correction functions for the correction data. This is advantageous as compared with the prior art which required determining correction data singly for each point on the picture. This technique allows the number of basic data to be reduced to a minimum.

Furthermore, this embodiment divides the horizontal scanning period into a plurality of short periods (in this example 16), in accordance with the number of sampling points in the horizontal direction. Central processing unit 214 computes correction data for each of these sampling points. Central processing unit 214 also computes this correction data during a period which excludes a period that is required for the read out address generating circuit 215 to access correction data storing circuit 213. Therefore, any race conditions are obviated. In addition, any disadvantages produced by the timing between the correction data access from correction data storing circuit 213 and the access addressing generator 215 are obviated. This expedient allows the time necessary to determine the convergence adjustment to be minimized. Furthermore, if the addressing by readout address generating circuit 215 contends with the accessing by central processing unit 214, the convergence correction waveforms may be disturbed, thereby causing noise on the picture. This is because the correction data cannot properly be read from correction data storing circuit 213 during the contention period. To eliminate this problem, a facilitated method may be used in which, for example, the access period of the central processing unit 214 may be confined to a horizontal or vertical flyback time. Other than this method, it is desirable and feasible to obviate the drawback of waiting for a considerable amount of time until the computation of the correction data has been completed by the central processing unit 214.

Figure 8:
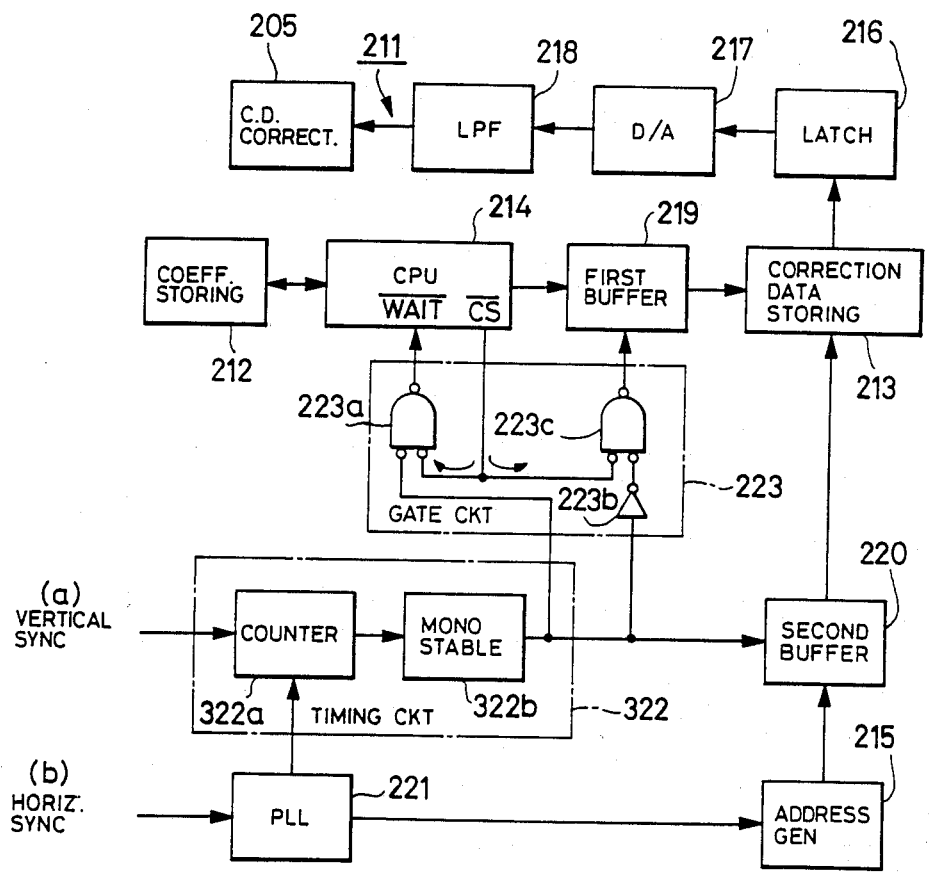
FIG. 8 is a circuit diagram of the digital convergence circuit of the fourth embodiment of the present invention.

FIG. 8 shows a circuit diagram of a digital convergence circuit 311 of a fourth embodiment of the present invention. In FIG. 8, the same components as those depicted in FIG. 6 are marked with the like symbols.

The fourth embodiment differs in the timing pulses used. A low level period of the timing pulses of this embodiment corresponds to an addressing period of readout address generating circuit 215. Contrastingly, a high level period of this signal corresponds to an access period to correction data storing circuit 213 by central processing unit 214. Since the addressing period is defined as a fixed period which does not fluctuate as a function of the horizontal deflection frequency, the access period to correction data storing circuit 213 by central processing unit 214 can be maintained constant.

This fourth embodiment includes timing generating circuit 322 which is different than the corresponding structure of the third embodiment. Timing generating circuit 322 of this fourth embodiment includes a counting circuit 322a which is reset by the vertical synchronization signals, for outputting trigger pulses every 1/16 of a horizontal scanning period. This circuit counts a predetermined number of frequency multiplying outputs of the horizontal synchronization signals transmitted from phase-locked loop circuit 221 to output the trigger pulses. A monostable multivibrator 322b is provided for outputting a timing pulse upon counter 322a reaching the desired count. This pulse continues only for a given period T, beginning when the output trigger pulse of counting circuit 322a is received. Hence, the timing pulse obtained from the timing generating circuit 322 has a specified time width T set by monostable 322b, and independent of the horizontal deflection frequency. Thus, when digital convergence circuit 311 is used in, for instance, a deflection frequency automatic follow-up type multiscan television receiver, the addressing period of the system gets longer as the horizontal deflection period gets longer, even if the horizontal deflection frequency is a very low frequency. This obviates the usual drawback that the computation time of central processing unit 214 is limited by the access period allocated to the central processing unit 214 being shortened by this frequency lengthening the address period. The time width T of the timing pulse may preferably be set to a length which allows unambiguous readout of the correction data; allowing for the time needed for change-over of the gates of buffer circuits 219 and 220 and also the time required for access to correction data storing circuit 213.

As described above in the fourth embodiment of the present invention, the period excluding the access period to correction data storing circuit 213 central processing unit 214 is allocated as an addressing period for each of the plurality of short periods into which one horizontal scanning period is divided, in accordance with the number of sampling points in the horizontal direction. Readout address generating circuit 215 reads the correction data during this addressing period. This is a fixed period that does not fluctuate in response to the horizontal deflection frequency.

The present invention provides the following excellent effects. The correction data for correcting convergence deviation of the scanning lines of the picture scan are defined as synthesized waves, formed of fundamental correction waves having a horizontal scanning period and a vertical scanning period weighted by coefficients. Therefore it is only necessary to store coefficients of the individual fundamental correction waves for generating the synthesized waves. These coefficients are stored as eigenvalues for the correction. Hence, the coefficient storing circuit which stores the coefficients of the fundamental correction waves does not require as large a capacity of storage—so long these fundamental correction waves can be determined. This lowers the cost of the coefficient storing circuit. To determine the fundamental correction waves, the coefficients are determined sequentially, beginning with the fundamental correction wave which exerts the greatest influence on the convergence correction data. Thus, convergence can be more easily adjusted, as compared with a system for determining the correction data one by one for every point on the picture.

As another advantage, the correction data is read by designating the address in accordance with clock pulses obtained by multiplying the frequencies of the horizontal synchronization signals in synchronism therewith in association with the correction data storing circuit in which the correction data for correcting the convergent deviation on the picture are stored in an address corresponding to a location on the picture. Therefore, when the number of scanning lines is varied, the readout address controlling means can change the readout starting address, and the same correction data is obtained at the center of the picture independent of the number of scanning lines. Consequently, the clock pulses used for the addressing by the address generating circuit can be the type having a fixed period phase-locked by the horizontal synchronization signals. Furthermore, the present invention can adapt to different horizontal deflection frequencies simply by changing the readout starting address without varying the clock frequency. Therefore, this change can be made by software processing, with no required addition of any particular delay circuit. The digital convergence circuit is suitable for correcting the convergence in the multi-scan television receiver which automatically follows up two or more horizontal deflection frequencies.

Furthermore, the correction data for correcting a convergent deviation of the scanning line of scanning the picture are defined as functional values, determined in accordance with the optimally set value when adjusting the convergence and with the deflection scanning position. In distinct contrast with a system which singly determines the correction data for every point on the picture, it becomes possible to determine only the coefficients characterizing the correcting functions that dominate the correction data. This allows a minimization of the number of basic data necessary for correcting the convergence deviation. Each horizontal scanning period is divided into a plurality of short periods in accordance with the number of sampling points in the horizontal direction. The central processing unit computes correction data during each short period, excluding a period required for the addressing by the readout address generating circuit which is allocated as the access period to the correction data storing circuit. The period excluding the access period to the correction data storing circuit by the central processing unit is allocated as the addressing period for each of the plurality of short periods with respect to the readout address generating circuit required for reading the correction data. This addressing period is defined as a fixed period, and does not fluctuate as a function of the horizontal deflection frequency. Consequently, it becomes feasible to avoid a drawback where the readout timing of the correction data from the correction data storing circuit does not allow a sufficient access period to the correction data storing circuit by the central processing unit which computes and outputs the correction data. The access period by the central processing unit can therefore be ensured to be sufficiently large. Hence, the time required for adjusting the convergence can be lowered. To eliminate the noise produced on the picture due to any contention between the readout address generating circuit and the central processing unit, there is an easy method in which, for example, the access period by the central processing unit is confined to a horizontal or vertical flyback time. It is also possible to obviate the inconvenience of waiting for a considerable amount of time until the central processing unit has completely performed the arithmetic on the correct data.

Although only a few embodiments have been described above, those having ordinary skill in the art will readily appreciate that many modifications are possible in the preferred embodiment without departing from the scope of the present invention. For example, although the foregoing embodiments have described on a protection television receiver, other types of television receivers could alternately be used. For example, a direct viewing type television receiver which has an image projected on a picture tube would also benefit by using the present invention. The fundamental correction waves which have been described are not confined to the abovedescribed seven types, but may be diversified as long as there are at least more than two types of fundamental correction waves which constitute the synthesized waves.

Accordingly, all such modifications are intended to be encompassed by the following claims.

What is claimed is:

1. A digital convergence circuit comprising:
   coefficient storing means for storing weighting coefficients for each of a plurality of fundamental correction waves which have at least one of a horizontal scanning period and a vertical scanning period, said fundamental correction waves being waves which can be weighted by said weighting coefficients to form synthesized waves representative of correction data for correcting a deviation of a scanning line of said picture;
   controlling means, coupled to said coefficient storing means to receive said weighting coefficients, for forming correction data using said weighting coefficients and said fundamental correction waves;
   correction data storing means, connected to said coefficient storing means, for storing said correction data for each of a plurality of sampling points, said sampling points splitting said picture into a matrix;
   said controlling means also for reading said correction data from said correction data storing means in synchronism with a deflection scanning; and
   convergence deviation correction means, receiving said correction data read by said controlling means, for correcting a convergence deviation of a scanning line of a picture based on said correction data.

2. A circuit as in claim 1 further comprising memory means for determining and storing said plurality of fundamental correction waves.

3. A circuit as in claim 1 wherein said means for forming correction data includes means for adding said coefficients to said fundamental waves as a weighting function.

4. A circuit as in claim 2 wherein said fundamental correction waves include waves from the group consisting of: parabolic undulation waves having a vertical scanning period and a horizontal scanning period, serrated undulation waves, parabolic undulation waves which are amplitude-modulated by a serrated undulation wave and a serrated undulation wave which is amplitude-modulated by a parabolic undulation wave.

5. A circuit as in claim 1 wherein said correction data storing means stores said correction data at respective addresses therein, and said convergence circuit and further comprising address generating means for generating an address indicative of a location on the screen to address said correction data from said correction data storing means for said location on the screen.

6. A circuit as in claim 5 wherein said address generating means generates addresses in synchronism with a horizontal scan.

7. A circuit as in claim 6 further comprising timing generating means for generating timing pulses to determine a readout timing.

8. An apparatus as in claim 7 further comprising a phase-locked loop for setting a synchronization by synchronizing with a synchronization signal of the picture.

9. A digital convergence circuit comprising:
   correction data storing means for storing correction data for correcting a convergent deviation of a scanning line of a picture scan at addresses corresponding to locations in said picture;
   address generating means, coupled to said correction data storing means, for producing addresses to address said correction data in said correction data storing means beginning at a readout starting address, in synchronism with clock pulses obtained by multiplying frequencies of synchronization signals of said picture; and
   readout address controlling means, connected to said address generating means, for determining said readout starting address in accordance with a number of said scanning lines, so that a same correction data is obtained at a center of said picture scan independent of the number of said scanning lines, and thereby maintaining a vertical symmetry of said correction data.

10. A circuit as in claim 9 wherein said correction data storing means is a digital circuit comprising:
    coefficient storing means for storing weighting coefficients for each of a plurality of fundamental correction waves which have at least one of a horizontal scanning period and a vertical scanning period, said fundamental correction waves being waves which can be weighted by said weighting coefficients to form synthesized waves representative of correction data for correcting a deviation of a scanning line of said picture;
    means coupled to said coefficient storing means to receive said weighting coefficients, for forming correction data using said weighting coefficients and said fundamental correction waves;
    correction data storing means connected to said coefficient storing means, for storing said correction data for each of a plurality of sampling points, said sampling points splitting said picture into a matrix;
    controlling means for reading said correction data from said correction data storing means in synchronism with a deflection scanning; and
    convergence deviation correction means, receiving said correction data read by said controlling means, for correcting a convergence deviation of a scanning line of a picture based on said correction data.

11. A circuit as in claim 9 wherein said synchronization signals are clock pulses, and further comprising clock pulse generating means for multiplying frequencies of said horizontal synchronization signals of said picture to produce said clock pulses.

12. An apparatus as in claim 10 wherein said fundamental correction waves include waves from the group consisting of: parabolic undulation waves having a vertical scanning period and a horizontal scanning period, serrated undulation waves, parabolic undulation waves which are amplitude-modulated by a serrated undulation wave and a serrated undulation wave which is amplitude-modulated by a parabolic undulation wave.

13. A circuit as in claim 10 wherein said correction data storing means stores said correction data at respective addresses therein, and further comprising address generating means for generating an address indicative of a location on the screen to address correction data from said correction data storing means for said location on the screen.

14. A circuit as in claim 13 further comprising input-/output means for storing said readout starting address under control of said readout address controlling means.

15. A digital convergence circuit comprising:
correction data storing means for storing correction data at respective addresses to correct a convergence deviation of a scanning line of a picture, said correction data storing means storing data for each of a plurality of sampling points which split said picture into a matrix;
readout address generating means, connected to address said correction data storing means, for designating an address of said correction data storing means from which to read said correction data in accordance with clock pulses obtained by multiplying frequencies of synchronization signals; and
central processing means for computing said correction data, and writing said data to said correction data storing means at addresses corresponding to locations on said picture, said central processing means including:
(a) means for computing said correction data by using a correcting function which includes a coefficient that is variably set and a variable indicating a deflection scanning position when adjusting the convergence,
(b) time division means for splitting one horizontal scanning period into a plurality of access periods, each shorter than said horizontal scanning period, said plurality of access periods corresponding to a number of said sampling points arranged in a horizontal direction of said picture scanning, and
(c) means for dividing said access periods into a first period which is a time required to addressing by said readout address generating means, and a second access period of said central processing means to said correction data storing means.

16. A circuit as in claim 15 further comprising a first buffer connected between said central processing means and said correcting data storing means, and a second buffer connected between said readout address generating means and said correction data storing means, said first and second buffers being controlled by said time division means such that said first buffer is enabled during said first period and said second buffer is enabled during said second period.

17. A digital convergence circuit as in claim 16 wherein said synchronization signals are horizontal synchronization signals.

18. A circuit as in claim 17 further comprising clock pulse generating means for multiplying frequencies of said horizontal synchronization signals of said picture to produce said clock pulses.

19. An apparatus as in claim 16 further comprising means for dividing the picture into a plurality of sections.

20. A circuit as in claim 19 wherein said dividing means includes timing generating means for producing a timing pulse at periods of a horizontal scanning period divided by said predetermined section.

21. A digital convergence circuit comprising:
correction data storing means for storing correction data at respective addresses to correct a convergence deviation of a scanning line of a picture, said correction data storing means storing data for each of a plurality of sampling points of said correction data storing means which split said picture into a matrix;
readout address generating means, connected to address said correcting data storing means, for designating an address of said correction data storing means from which to read said correction data in accordance with clock pulses obtained by multiplying frequencies of horizontal synchronization signals;
central processing means for computing said correction data, and for writing said data to said correction data storing means at addresses corresponding to locations on said picture, said central processing means including means for computing said correction data by using a correcting function which includes a coefficient that is variably set, and a variable indicating a deflection scanning position when adjusting the convergence; and
timing generating means, for allocating (a) a plurality of short periods into which one horizontal scanning period is split in proportion to the number of sampling points arranged in the horizontal direction, and (b) a period left in each short period after an access period to said correction data storing means by said central processing means as an addressing period, said addressing period being defined as a fixed period which does not fluctuate with a horizontal deflection frequency.

22. A circuit as in claim 21 wherein said timing generating means includes a monostable multivibrator for producing a pulse with a fixed time period that defines said fixed period.

23. A circuit as in claim 22 further comprising a first buffer connected between said central processing means and said correcting data storing means, and a second buffer connected between said readout address generating means and said correction data storing means, said first and second buffers being controlled by said timing generating means such that said first buffer is enabled during said first period and said second buffer is enabled during said second period.

24. A circuit as in claim 21, further comprising a first buffer connected between said central processing means and said correcting data storing means, and a second buffer connected between said readout address generating means and said correction data storing means, said first and second buffers being controlled by said timing generating means such that said first buffer is enabled during said first period and said second buffer is enabled during said second period.

25. A circuit as in claim 23 further comprising clock pulse generating means for multiplying frequencies of said horizontal synchronization signals of said picture to produce said clock pulses.

26. An apparatus as in claim 23 further comprising means for dividing the picture into a plurality of sections.

27. A circuit as in claim 26 wherein said dividing means includes timing generating means for producing a timing pulse at periods of a horizontal scanning period divided by said predetermined section.

28. A method of correcting digital convergence in a television receiver, comprising the steps of:
- determining a plurality of fundamental correction waves for correcting said convergence;
- adjusting weightings of each of said fundamental correction waves to determine which of said fundamental correction waves exerts a greatest influence on correction of the convergence deviation;
- determining weighting values for each of said fundamental waves starting at a fundamental wave which exerts a greatest influence on said convergence deviation, by minimizing said convergence deviation as an adjustment of said fundamental wave;
- storing said weighting values as coefficients in a coefficient storing structure, at respective addresses which indicate respective locations on the picture;
- forming correction data using said coefficients and said fundamental waves for respective locations on the picture; and
- reading said correction data from said correction data storage means in synchronism with a deflection scanning.

29. A method as in claim 28 wherein said fundamental correction waves include parabolic undulation waves, serrated undulation waves, parabolic undulation waves amplitude-modulated by serrated undulation waves and serrated undulation waves amplitude-modulated by parabolic undulation waves.

30. A method as in claim 28 comprising the further step of controlling a readout starting address in accordance with a number of scanning lines of the picture, so that a same correction data is obtained at a center of the picture scan independent of the number of scanning lines.

31. A method as in claim 28 comprising the further steps of
- splitting one horizontal scanning period into a plurality of access periods, each shorter than said horizontal scanning period, said plurality of access periods corresponding to a number of sampling points arranged in a horizontal direction of said picture scanning;
- dividing said access periods into a first period which is a time required for addressing by a readout generating structure and a second period which is an access period by said central processing structure; and
- controlling said readout generating and central processing structures such that they operate only during their respective access periods.

32. A method as in claim 31 wherein said addressing period is a fixed period which does not fluctuate with horizontal deflection frequency.

* * * * *

UNITED STATES PATENT AND TRADEMARK OFFICE
CERTIFICATE OF CORRECTION

PATENT NO. : 4,870,329

DATED : September 26, 1989

INVENTOR(S) : ARA

It is certified that error appears in the above-identified patent and that said Letters Patent is hereby corrected as shown below:

Title page:

In the Patent Field [73] Assignee, change the Assignee from "Nippon Gijutsu Boeki Co., Ltd." to --NEC HOME ELECTRONICS LTD.--

Signed and Sealed this

Thirteenth Day of November, 1990

Attest:

HARRY F. MANBECK, JR.

*Attesting Officer*     *Commissioner of Patents and Trademarks*